US012340328B1

(12) United States Patent
Black et al.

(10) Patent No.: US 12,340,328 B1
(45) Date of Patent: Jun. 24, 2025

(54) CROWD SOURCING ROADSIDE ASSISTANCE

(71) Applicant: United Services Automobile Association (USAA), San Antonio, TX (US)

(72) Inventors: Robert Lee Black, San Antonio, TX (US); Timothy Blair Chalmers, San Antonio, TX (US); Zachery C. Lake, Aubrey, TX (US); Justin Dax Haslam, San Antonio, TX (US); Matthew Robert Byrd, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 234 days.

(21) Appl. No.: 17/874,065

(22) Filed: Jul. 26, 2022

Related U.S. Application Data (60) Provisional application No. 63/227,164, filed on Jul. 29, 2021.

(51) Int. Cl.
  *G06Q 10/0631* (2023.01)
  *G06Q 30/0204* (2023.01)
  *G06Q 30/0279* (2023.01)
  *G06Q 50/40* (2024.01)

(52) U.S. Cl.
  CPC ... *G06Q 10/06315* (2013.01); *G06Q 30/0205* (2013.01); *G06Q 30/0279* (2013.01); *G06Q 50/40* (2024.01)

(58) Field of Classification Search
  None
  See application file for complete search history.

(56) References Cited

U.S. PATENT DOCUMENTS

| 10,533,119 B2 * | 1/2020 | Schmatloch | C08G 18/12 |
|---|---|---|---|
| 11,399,101 B2 * | 7/2022 | Basir | H04W 4/90 |
| 2012/0259745 A1 * | 10/2012 | Kusada | G06Q 20/14 705/28 |
| 2017/0006135 A1 * | 1/2017 | Siebel | H04L 67/566 |
| 2019/0122155 A1 * | 4/2019 | Irazabal | G06Q 10/06315 |
| 2019/0279266 A1 * | 9/2019 | Hayrabedian | G06Q 30/0611 |

(Continued)

OTHER PUBLICATIONS

Guerna A, Bitam S, Calafate CT. Roadside Unit Deployment in Internet of Vehicles Systems: A Survey. Sensors (Basel). Apr. 21, 2022;22(9):3190. (Year: 2022).*

*Primary Examiner* — Stephanie Z Delich
(74) *Attorney, Agent, or Firm* — Fletcher Yoder, P.C.

(57) ABSTRACT

The present disclosure is related to a roadside assistance system that may utilize crowdsourcing to collect and monitor user data, such as user input and user behavior, to build a machine learning model. In response to receiving a request for roadside assistance from a driver, the roadside assistance system may utilize the machine learning model to identify a suitable user who may provide the requested roadside assistance within a suitable time, and guide the identified suitable user to a location of the requesting driver to perform the requested roadside service. Furthermore, the roadside assistance system may direct suitable user to supply locations to pick up certain supplies for the requested roadside service. Additionally, the roadside assistance system may utilize crowdsourcing to provide rental vehicles to users.

19 Claims, 3 Drawing Sheets

(56) References Cited

U.S. PATENT DOCUMENTS

| | | | | |
|---|---|---|---|---|
| 2019/0392367 A1* | 12/2019 | Gara | ................ | G06Q 20/384 |
| 2020/0294326 A1* | 9/2020 | Marr | ..................... | G07C 5/02 |
| 2022/0051156 A1* | 2/2022 | Kumar | ............... | G08G 1/0145 |
| 2022/0126864 A1* | 4/2022 | Moustafa | ............ | G06T 1/0007 |

* cited by examiner

CROWD SOURCING ROADSIDE ASSISTANCE

CROSS-REFERENCE TO RELATED APPLICATION

The present application claims the benefit of and priority to U.S. Provisional Patent Application Ser. No. 63/227,164, titled "CROWD SOURCING ROADSIDE ASSISTANCE," which was filed on Jul. 29, 2021, and which is herein incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Roadside assistance provides services assisting users (e.g., drivers) whose vehicles have issues (e.g., mechanical problems, electrical problems, software problems) that leave the users stranded. The users may contact automobile service providers for the roadside assistance. Additionally or alternatively, the users may contact their insurance providers that may provide the roadside assistance via other automobile service providers, which may have certain partnerships and/or affiliations with the corresponding insurance providers of the users. However, when waiting for the roadside assistance, users often wait an indefinite amount of time before the roadside assistance arrives.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a processor coupled to a communication component. The processor may receive a list of services and driving behavior data associated with each of a group of users. Each list of services may include one or more services that a respective user of the group of users is willing to provide. The processor may then build a model representative of an expected location of each of the group of users based on the driving behavior data. In response to receiving a request for roadside assistance from a first computing device associated with a first user, the processor may identify a portion of the group of users to perform the roadside assistance based on the model and send a request to perform the roadside assistance to one or more computing devices associated with the portion of the group of users. The processor may receive an acceptance to the request from a second computing device associated with a second user of the portion of the group of users. Furthermore, the processor may send a location of the first computing device to the second computing device and send information associated with the second user to the first computing device.

In another embodiments, a method may include receiving, via at least one processor, a list of services associated with each of a group of users. Each list of services may include one or more services that a respective user of the group of users is willing to provide. The method may also include receiving, via the at least one processor, driving behavior data of each of the group of users, and building a model representative of an expected location of each of the group of users based on the driving behavior data of each of the group of users. The method may further include receiving a request for roadside assistance from a first computing device associated with a first user, identifying a portion of the group of users to perform the roadside assistance based on the model, sending a request to perform the roadside assistance to one or more computing devices associated with the portion of the group of users, receiving an acceptance to the request from a second computing device associated with a second user of the portion of the group of users, sending a first location of the first computing device to the second computing device after receiving the acceptance, and sending information associated with the second user to the first computing device.

In yet another embodiment, a non-transitory computer-readable medium including computer-executable instructions that, when executed, are configured to cause one or more processors to perform operations. The operations may include receiving, via the one or more processors, a list of services associated with each of a group of users and each list of services may include one or more services that a respective user of the group of users is willing to provide, receiving, via the one or more processors, driving behavior data of each of the group of users, building a model representative of an expected location of each of the group of users based on the driving behavior data of each of the group of users, receiving a request for roadside assistance from a first computing device associated with a first user, identifying a portion of the group of users to perform the roadside assistance based on the model, sending a request to perform the roadside assistance to one or more computing devices associated with the portion of the group of users, receiving an acceptance to the request from a second computing device of the one or more computing devices, wherein the first second device is associated with a second user of the portion of the group of users, sending a first location of the first computing device to the second computing device after receiving the acceptance, and sending information associated with the second user to the first computing device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Example methods, devices, systems, and applications are described herein. It should be understood that the word "example" is used here to mean serving as an example, instance, or illustration. Any embodiment or feature described herein as being an example is not necessarily to be constructed as advantageous over other embodiments or features unless stated as such. Different embodiments can be utilized and changes can be made without departing from the scope of the subject matter presented herein.

Further, any enumeration of elements, blocks, or process steps in this specification is for purpose of clarity. Therefore, such enumeration should not be interpreted to imply that these elements, blocks, or process steps adhere to a particular arrangement or are carried out in a particular order.

Additionally, when introducing elements of various embodiments, the articles "a," "an," "the," and "said" are intended to mean that there are one or more of the elements. The terms "comprising," "including," and "having" are intended to be inclusive and mean that there may be additional elements other than the listed elements.

When operating a vehicle during a road trip, a driver may encounter unexpected situations that are out of the driver's control. For instance, the vehicle may have certain issues, such as mechanical faults, electrical faults, software issues, and the like. Such issues may leave the driver stranded on the road. In some cases, the driver may contact an insurance provider that provides an automobile insurance coverage for the user. As a user or a customer of the insurance provider, the driver may receive certain roadside assistance from an automobile service provider (e.g., an automobile repair shop) that may have a partnerships and/or an affiliation with the insurance provider of the driver. In other cases, the driver may directly contact other automobile service providers for roadside assistance. However, the driver may experience an indefinite amount of waiting time before the roadside assistance arrives.

As crowdsourcing becomes more prevalent in various service sectors using shared data from different users, the insurance provider or other service providers may utilize the crowdsourcing to improve a roadside assistance process to reduce the waiting time for the driver stranded on the road. In one embodiment, after receiving a request for roadside assistance from the driver, a roadside assistant system may query user data obtained through the crowdsourcing and monitored user behavior to quickly identify a suitable user who can provide the requested roadside assistance within a suitable time. For example, the roadside assistant system may determine that the suitable user is within a certain range or distance to a location where the requesting driver is stranded. The roadside assistant system may guide the suitable user to the location to help the stranded driver. In some embodiments, a broadcast signal may be sent via a wireless antenna (e.g., to Wi-Fi or Bluetooth devices) to nearby computing devices (e.g., mobile devices) to crowd-source a request for a ride to allow the stranded driver to a desired destination based on nearby users in the area. In such ways, the waiting time may be reduced. In certain embodiments, the roadside assistant system may provide incentives or rewards to the suitable user who provided the requested roadside assistance to the stranded driver.

As used herein, crowdsourcing may refer to a sourcing model in which individuals or organizations obtain goods or services (e.g., ideas, voting, micro-tasks, or finances) from a relatively large, open and evolving group of users/participants. Crowdsourcing may use a network (e.g., the internet) to attract and divide work between users/participants to achieve a cumulative result. Crowdsourcing may come from a less-specific (or more public) group. As a comparison, outsourcing may be commissioned from a more specific group. For example, in the case of the driver stranded on the road, the less-specific group may include the users whose information (e.g., driving-related information) may be collected and analyzed by the insurance provider via the crowdsourcing, while the more specific group may include automobile service provider(s) that may have a partnership with the insurance provider.

Embodiments of the present disclosure are generally directed toward a roadside assistance system that utilizes crowdsourcing to collect user data (e.g., abilities and/or skills for providing roadside assistance) and monitors user behavior (e.g., driving behavior, location data). Based on the collected user data and monitored user behavior, the roadside assistance system may build a model indicative of expected locations of various users, capabilities of the users, and the like. When receiving a request for roadside assistance from a driver, the roadside assistance system may determine whether the requested roadside assistance is related to a service (e.g., a ride-share, an air pump, a flat tire replacement, a car battery jumping or replacement, or a fuel refill) that is listed as a capability of certain users represented in the model. As such, the roadside assistance system identifies, using the model, a list of users (e.g., other drivers) who may be willing provide the requested roadside assistance. Based on the list of users and their location data with respect to a location of the requesting driver, the roadside assistance system may identify a suitable individual or user who may be located within a threshold distance or the closest relative distance as compared to other users on the list to the location of the requesting driver. Furthermore, the roadside assistance system may guide the identified user to the location to provide the requested roadside assistance to the requesting driver.

In addition, the roadside assistance system may direct the suitable user to locations where equipment may be prepared and made available for pick up at various locations to perform certain tasks. That is, certain products/supplies (e.g., a fuel tank, an air pump, a replacement car battery, a battery jump cable, or a battery jump starter) that may be used for providing the requested roadside service may be obtained in route to assisting a driver requesting the assistance.

Additional details with regard to the roadside assistance system, including collecting user data using crowdsourcing, monitoring user behavior, building a model representative of user's capabilities and expected locations, and identifying a suitable user for providing roadside assistance to a driver or individual requesting assistance will be discussed in detail below with reference to FIGS. 1-4.

Figure 1:
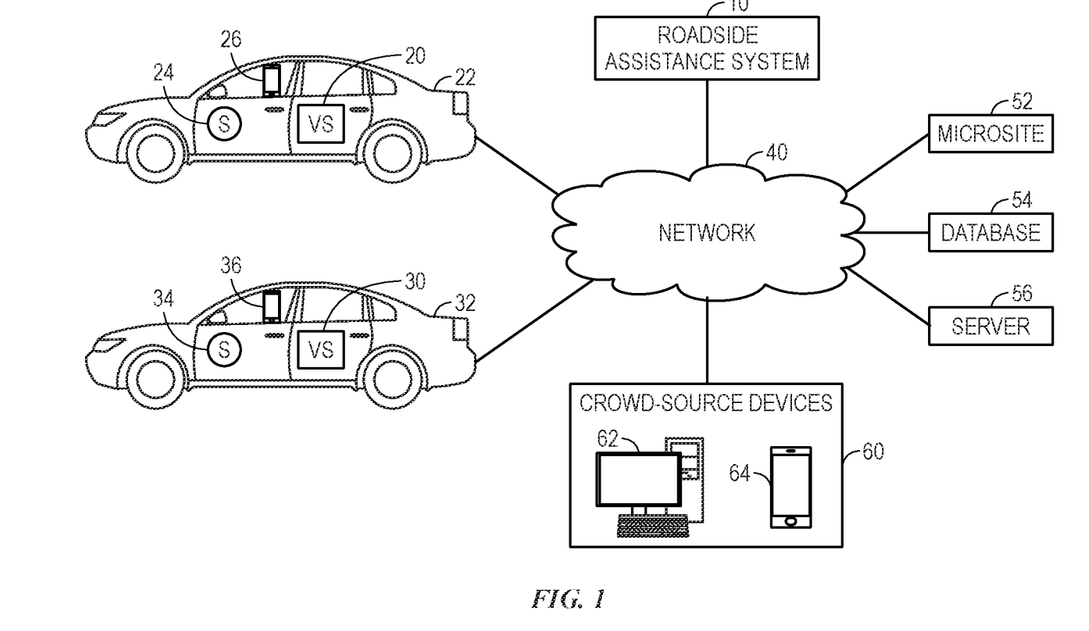
FIG. 1 illustrates a block diagram of a system for using crowdsourcing to facilitate roadside assistance via a roadside assistance system, in accordance with embodiments described herein.

By way of introduction, FIG. 1 illustrates a block diagram of a system for using crowdsourcing to facilitate roadside assistance via a roadside assistance system 10. The system may aggregate and analyze user data (e.g., driver data) from a variety of data sources to assist the roadside assistance system 10 to provide roadside assistance requested by certain individuals. The user data may include a list of capabilities or skills that may be related to vehicle maintenance or support (e.g., changing tires, recharging or replacing dead batteries, supplying gas, and the like), user behavior data (e.g., driving behavior), historical roadside assistance record data, and the like. In some cases, the user data may also include information regarding the user's lack of knowledge or experience with certain skills (e.g., can't fix radiator). The roadside assistance system 10 may utilize the user data and apply machine learning algorithms to recognize trends, patterns, and other properties to build a model that may be used to identify candidates that may be available for roadside assistance opportunities to assist other individuals who may experience issues with their vehicles during road trips.

In certain embodiments, the roadside assistance system 10 may be communicatively coupled to a network 40, which may include collections of computing systems, the Internet, an Intranet system, or the like. The network 40 may facilitate communication between the roadside assistance system 10 and the variety of data sources. For instance, the network 40 may be communicatively coupled to a first vehicle system 20 on a first vehicle 22 of a first user and a second vehicle system 30 on a second vehicle 32 of a second user. Although the illustrated embodiment includes two vehicle systems on two user vehicles, it should be noted that, in other embodiments, the network 40 may be communicatively coupled to more vehicle systems on more user vehicles.

In certain embodiments, the vehicle systems may monitor user driving behavior associated with operations of the corresponding vehicles. For instance, the vehicle system 20 may monitor the locations of the first vehicle 22, frequency of use of the first vehicle 22 by a user, times at which the first vehicle 22 is in use by the user, mileage driven by the first vehicle 22, routes traveled by the first vehicle 22 more than a threshold number of times over a period of time, passenger(s) on the first vehicle 22 that travel with the user more than a threshold number of times over a period of time, and the like. In addition, the vehicle system 20 may be communicatively coupled to one or more sensors 24 within the first vehicle 22 to acquire data regarding the user, the passenger(s), the operations of the first vehicle 22, and so forth. The one or more sensors 24 may include any suitable sensor, such as infrared sensor(s), pressure sensor(s), weight sensor(s), image sensor(s), LIDAR sensor(s), location sensor(s), vehicle sensor(s) (e.g., odometer, speedometer, brake sensor), and the like. By way of example, the vehicle system 20 may be communicatively coupled to a global positioning system (GPS) of the first vehicle 22, an odometer of the first vehicle 22, and other sensors that may provide information regarding the user driving behavior and/or operation (e.g., location) of the first vehicle 22.

In some embodiments, the vehicle system 20 may be communicatively coupled to other computing devices such as mobile devices 26 (e.g., mobile phones, tablet devices, and the like) to monitor the usage of the mobile devices 26 during the operation of the first vehicle 22. The usage of the mobile devices 26 may provide additional information regarding the user driving behavior during the operation of the first vehicle 22.

The roadside assistance system 10 may receive the user behavior data collected by the vehicle system 20 and/or the mobile devices 26 and store the user behavior data in one or more databases 54. The user behavior data and other relevant data acquired by the mobile devices 26 may be used to build the machine learning model to facilitate the roadside assistance.

It should be noted that the features and/or functionalities described above with regard to the vehicle system 20, the one or more sensors 24, and the mobile devices 26 may be applied to other vehicle systems (e.g., a vehicle system 30 on a second vehicle 32), other sensors (e.g., one or more sensors 34 on the second vehicle 32), and other mobile devices (e.g., mobile devices 36 on the second vehicle 32) associated with different vehicles and users.

In some embodiments, the network 40 may be communicatively coupled to a microsite 52. As described previously, the roadside assistance system 10 may collect user data, such as abilities and/or skills for providing roadside assistance, via the microsite 52. In some embodiments, the microsite 52 may be hosted by a server of the insurance provider and may allow users to sign up or indicate a willingness to help others seeking roadside assistance. As used herein, the microsite 52 may refer to an individual web page or a small cluster of pages that are configured to function as a discrete entity within an existing website or to complement an offline activity. With this in mind, a sign-up process on the microsite 52 may include receiving user data indicative of certain abilities or tasks that the user may be willing to provide. For instance, tasks may include providing a ride for another user, supplying gas for a user, picking up supplies for a user, and the like. In addition, the microsite 52 may also receive user data related to certain skills that the user may be able to provide. The skills may be related to providing vehicle services, such as changing tires, recharging or replacing dead batteries, or other skills, such as medical or first aid skills (e.g., CPR). In some embodiments, the sign-up process may be part of an enrollment process when the user applies for automobile insurance. In some embodiments, the user input may be acquired by other methods. For example, the user may receive (e.g., via an email, a text message, or a phone call) a survey or questionnaire for collecting user input regarding the abilities and/or skills listed above. In some embodiments, the roadside assistance system 10 may solicit or request that users that are accessible to the roadside assistance system 10 participate in the sign-up process. Alternatively, the roadside assistance system 10 may send information to the users indicating that the users may receive compensation (e.g., discount on insurance premium, credits, or the like) or other rewards if the users sign up and perform certain roadside assistance for others.

In some embodiments, the network 40 may also be communicatively coupled to one or more databases 54, which may store the user data, such as skills that the users may provide (e.g., changing tires, recharging or replacing dead batteries, supplying gas, and the like), the user's driving behavior data, and other data that may be suitable for facilitating various roadside assistance for stranded individuals. As described above, the user data may be acquired from different data sources (e.g., the server of the insurance provider, the vehicle systems, the various sensors, the mobile devices, the crowd source devices) using different methods (e.g., via a microsite, an email, a text message, or a phone call). The acquired user data may include different data format and/or data structures, which may inhibit data queries to find a group of suitable users that may provide services in respond to requests for roadside assistance from other users.

As such, in some embodiments, the acquired user data may be re-organized or re-formatted into a unified data format or a data structure. For example, the acquired user data may be categorized and formatted into individual vectors (e.g., feature vectors) for each user based on multiple dimensions of the user data, such as name, insurance identification (ID) number, abilities for providing roadside assistance, skills for providing roadside assistance, other skills, expected drive times, expected drive routes, expected passenger data, frequently used vehicle(s), and so on. As such, finding the group of suitable users in the database to perform a roadside task may include identifying a group of vectors based on quantifying skill and/or behavior similarities of users (e.g., by computing distances between vectors). Based on the created vectors, certain computations (e.g., vector distance calculation, nearest neighbor search) may be performed to identify a group of users that may provide services in response to requests for roadside assistance.

In certain embodiments, after receiving the user data from various data sources, the roadside assistance system 10 may determine an identification number (e.g., the insurance ID number), a code, or a parameter associated with each user and create a digital ledger (e.g., a blockchain) to track the user data received for each user. Each ledger may include a header containing the identification parameter and a payload that may include other data entries (e.g., abilities, skills, driving behavior) received by the roadside system 10. The ledgers may be dynamic ledgers that may grow when receiving additional user data (e.g., new skills for roadside assistance). The ledgers may recede in size when the data is deleted or modified. In some embodiments, the payload of the ledger may be structured according to a particular order, such that different types of data are stored in different positions or offsets with respect to the header. For example, skills related to changing tires may be stored in one position of the ledger and abilities related to providing fuel may be stored in another position of the ledger. In this way, the roadside system 10 and other computing systems may request a collection of data from the database 54 for database queries more efficiently (e.g., using less searching/querying time, reducing computing time and/or power). For example, the roadside assistance system 10 may retrieve payload data from the same offset position in multiple ledgers and perform data analysis based on the retrieved data.

In some embodiments, the network 40 may also be communicatively coupled to one or more servers 56. The one or more servers 56 may include computing servers (e.g., hosting and/or support at least part of the roadside assistance system 10), storage servers (e.g., hosting and/or support the one or more databases 54), other server(s) dedicated to various task(s) (e.g., communicating with crowd-source devices), and the like.

In some embodiments, the network 40 may also be communicatively coupled to crowd-source devices 60. The crowd-source devices 60 may include a variety of computing devices associated with the users, such as desktop computers 62, mobile phones 64, tablets, wearable devices, or any suitable devices that can be used for crowdsourcing. For example, the crowd-source devices 60 may have crowd-sourcing software linked to the microsite 52 or other crowd-sourcing web pages and/or microsites that the microsite 52 may access.

Although the system described in FIG. 1 is described in a particular configuration, it should be noted that the system may be implemented in any suitable configuration and is not limited to the configuration presented herein. For example, although the vehicle systems (e.g., vehicle system 20, vehicle system 30), the microsite 52, the database 54, the one or more servers 56, or the one or more crowd-source devices 60 are described as being communicatively coupled to the roadside assistance system 10 via the network 40, in other embodiments, at least some of the components listed above may be communicatively coupled directly to the roadside assistance system 10.

Figure 2:
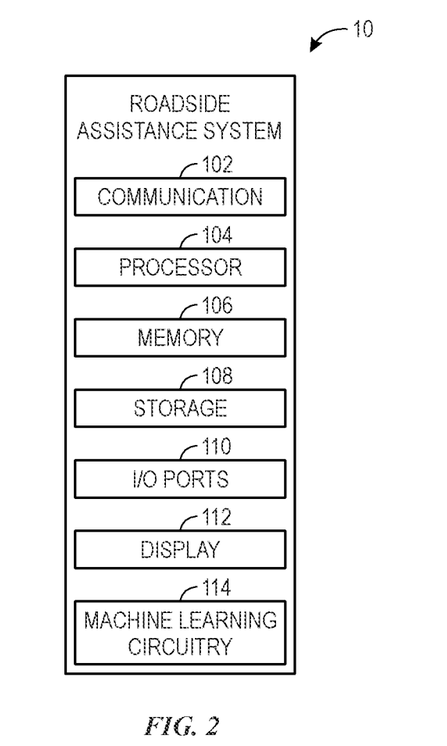
FIG. 2 illustrates a block diagram of the roadside assistance system of FIG. 1, in accordance with embodiments described herein.

Referring now to FIG. 2, a block diagram of the roadside assistance system 10 of FIG. 1 is illustrated. The roadside assistance 10 may include various types of components that may assist the roadside assistance system 10 in performing various types of computer tasks and operations. For example, the roadside assistance system 10 may include a communication component 102, a processor 104, a memory 106, a storage 108, input/output (I/O) ports 110, a display 112, a machine learning circuitry 114, and the like.

The communication component 102 may be a wireless or wired communication component that may facilitate communication between the roadside assistance system 10 and the variety of data sources via the network 40. For example, the communication component 102 may allow the roadside assistance system 10 to obtain the user data from the variety of data sources, such as the one or more databases 54 (e.g., user insurance record database, user behavior database, user input database), user devices (e.g., smart phones, desktop computers, laptops, tablets), vehicle systems, and the like. The communication component 102 may receive and send notifications (e.g., requests for providing certain roadside assistance to other users) to the user devices. The communication component 102 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 104 may process instructions for execution within the roadside assistance system 10. The processor 104 may include single-threaded processor(s), multi-threaded processors, or both. The processor 104 may process instructions stored in the memory 106 and/or the storage 108. The processor 104 may also include hardware-based processor(s) each including one or more cores. The processor 104 may include general purpose processor(s), special purpose processor(s), or both. The processor 104 may be communicatively coupled to other internal components (such as the communication component 102, the storage 108, the I/O ports 100, and the display 112).

The memory 106 and the storage 108 may be any suitable articles of manufacture that can serve as media to store processor-executable code, data, or the like. These articles of manufacture may represent computer-readable media (e.g., any suitable form of memory or storage) that may store the processor-executable code used by the processor 104 to perform the presently disclosed techniques. As used herein, applications may include any suitable computer software or program that may be installed onto the roadside assistance system 10 and executed by the processor 104. The memory 106 and the storage 108 may represent non-transitory computer-readable media (e.g., any suitable form of memory or storage) that may store the processor-executable code used by the processor 104 to perform various techniques described herein. It should be noted that non-transitory merely indicates that the media is tangible and not a signal.

The I/O ports 110 may be interfaces that may couple to other peripheral components such as input devices (e.g., keyboard, mouse), sensors, input/output (I/O) modules, and the like. The display 112 may operate as a human machine interface (HMI) to depict visualizations associated with software or executable code being processed by the processor 104. In one embodiment, the display 112 may be a touch display capable of receiving inputs from an operator of the roadside assistance system 10. The display 112 may be any suitable type of display, such as a liquid crystal display (LCD), plasma display, or an organic light emitting diode (OLED) display, for example. Additionally, in one embodiment, the display 112 may be provided in conjunction with a touch-sensitive mechanism (e.g., a touch screen) that may function as part of a control interface for the roadside assistance system 10.

In certain embodiments, the roadside assistance system 10 may be trained (e.g., via machine learning) to improve services associated with the roadside assistance. As mentioned previously, the roadside assistance system 10 may utilize the user data to build a machine learning model to facilitate roadside assistance for users who may experience issues with their vehicles during road trips. For example, training data, such as historical roadside assistance record data, user input data, user behavior data, or a combination thereof, may be used as input data to train the roadside assistance system 10 using machine learning algorithms. After training with the machine learning, the roadside assistance system 10 may have improved parameters (e.g., monitoring, analysis, and/or decision-making parameter(s)) and/or model(s) (e.g., simulation model, optimization model, predictive model, forecast model).

The machine learning algorithms may be implemented using machine learning circuitry 114 or software that may access the training data stored in the database 54. Depending on the inferences, the machine learning circuitry 114 or the software may implement different forms of machine learning. In some embodiments, a supervised machine learning may be implemented. In some embodiments, an unsupervised machine learning may be implemented. As used herein, machine learning may refer to algorithms and statistical models that the roadside assistance system 10 uses to perform a specific task with or without using explicit instructions. For example, a machine learning process may generate a mathematical model (e.g., simulation model, optimization model, predictive model, forecast model) based on a sample of the clean data, known as "training data," in order to make predictions or decisions without being explicitly programmed to perform the task.

Additionally, the roadside assistance system 10 may include other suitable components (e.g., a network controller, a power supply, or a battery). It should be noted that the components described above with regard to the roadside assistance system 10 are exemplary components, and the roadside assistance system 10 may include additional or fewer components as shown.

As mentioned previously, the roadside assistance system 10 may utilize the user data to build a machine learning model to facilitate roadside assistance for users who seek roadside assistance. For example, training data, such as historical roadside assistance record data, user input data, user behavior data, or a combination thereof, may be used as input data to train the roadside assistance system 10 to build the machine learning model. With the preceding in mind, various types of data described herein may be used to create a machine learning model to enable the roadside assistance system 10 to more efficiently perform certain roadside assistance tasks described herein. As will be appreciate below, the machine learning algorithms may enable the roadside assistance system 10 to better identify users that may be willing and/or capable of performing certain roadside tasks based on their user data, monitored behavior (e.g., location), and the like.

Figure 3:
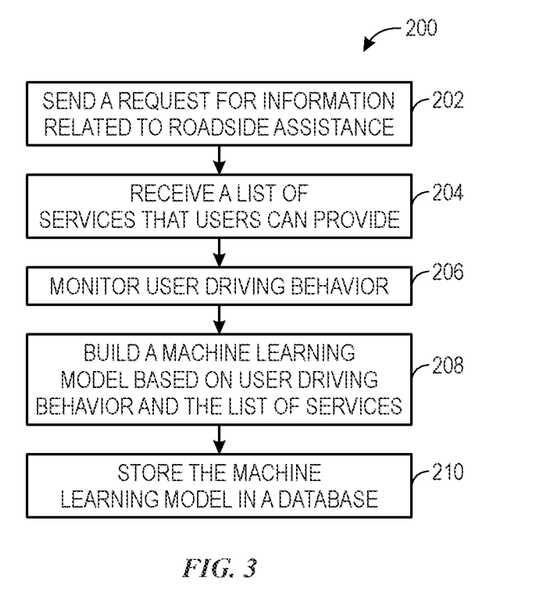
FIG. 3 illustrates a flow diagram of an example method for building a machine learning model to facilitate roadside assistance, in accordance with embodiments described herein.

With the foregoing in mind, FIG. 3 illustrates a flow chart of a method 200 for building a machine learning model to facilitate roadside assistance. Although the example method 200 described in FIG. 3 is described in a particular order, it should be noted that the example method 200 may be performed in any suitable order and is not limited to the order presented herein. It should also be noted that although each processing block is described below in the example method 200 as being performed by the roadside assistance system 10, other suitable computing system(s) may perform at least one of the process blocks described herein.

Referring now to FIG. 3, at process block 202, the roadside assistance system 10 may send a request to a user (e.g., a user of an insurance provider that may be accessible via the crowd-source devices 60) for information related to roadside assistance. The requested information may include roadside assistance services and/or skills that the user may be capable of or willing to provide for other users. In some embodiments, the request may be presented to the user via the microsite 52 (e.g., when the user visits a webpage of the insurance provider using his/her/their device). In some embodiments, the request may be presented to the user during an enrollment process when the user applies for an automobile insurance using the user's computing device. In other embodiments, the request may be sent to the user via emails, text messages, or phone calls. The request may be presented or sent in various format, such as online fillable forms, questionnaires, in-application data collection, and the like.

In some embodiments, the request may be sent to a limited number of users that are located within a certain area, proximity, or threshold distance of a landmark or location. In this way, the users that receive the request may be characterized or associated with a particular location area that may make it more practical for the users to provide roadside services without detracting from the users' expected commute or location. As such, prior to sending the request, the roadside assistance system 10 may retrieve location data from user devices. Alternatively, the roadside assistance system 10 may use expected location data of the users, as determined based on historical location data and machine learning algorithms, to identify the limited number of users located within the area.

In response to receiving the request for information related to roadside assistance, at process block 204, the roadside assistance system 10 may receive a list of services that users can or may be willing to provide. The services may include changing tires, recharging or replacing dead batteries, supplying gas, and the like. As described previously, the roadside assistance system 10 may utilize crowd-sourcing methodologies to collect user input including the list of skills that users can provide for roadside assistance. The list of services may be acquired via microsites, emails, text messages, phone calls, user inputs, any other suitable methods, or combinations thereof. In some embodiments, an insurance provider may encourage the users to provide the list of services by indicating that the users may receive compensation (e.g., discount on insurance premium, credits, cash, or the like) for providing a requested service.

At process block 206, the roadside assistance system 10 may monitor user driving behavior. The user driving behavior data may include any suitable data associated with operations of vehicles by the users, such as data monitored by the vehicle systems, including locations of the vehicles, frequency of use of the vehicles, times at which the vehicles are regularly in use by the users, frequent routes of the vehicles, frequent passenger(s) on the vehicles with the users, and the like. Additionally, various sensors (e.g., the one or more sensors 24 within the first vehicle 22) and/or other computing devices (e.g., mobile devices 26) may be used to acquire the user driving behavior data.

The roadside assistance system 10 may receive the user data, including the list of services that users can provide and the user driving behavior monitored/acquired by the vehicle systems and/or the mobile devices, and store the received information in the one or more databases 54. The user data may be re-organized or re-formatted into a unified data format or a data structure (e.g., feature vectors) to enable the user data to be stored efficiently in a respective data storage component, efficiently retrieved via a query or other search operation, or the like. For example, the user data may be categorized into different groups based on different types (e.g., ride-share, changing tires, recharging batteries, supplying gas) of services that users can provide and different characteristics (e.g., locations, frequencies or times of use of vehicles, routes of the vehicles) of the user driving behavior. Each group of the user data may be stored in a respective section of a pre-defined data structure. Each group of the user data may be assigned with an identifier (e.g., index number, address). As such, the roadside assistance system 10 may only search a portion of the user data relevant to a request for roadside assistance from a requesting user based on one of more identifiers corresponding to certain keywords or other suitable characteristics (e.g., changing tire, location, time) of the request for roadside assistance. In some embodiments, the user data may be used to create digital ledgers (e.g., blockchains) to facilitate tracking the user data (e.g., by the roadside assistance system 10). The re-organization or re-formation of the user data, and/or using the user data to create the digital ledger may be performed by the roadside assistance system 10, some other computing devices (e.g., the one or more servers 56), or a combination thereof. In some embodiments, the user data may be updated on a periodic basis (e.g., monthly, quarterly, or yearly) by sending an update notification to the users for updating their abilities and/or skills associated with the roadside assistance, on an on-demand basis (e.g., the users request to add new skill(s) in their records), or via other methods (e.g., prompting the user to update the user data when the users log in their insurance accounts or visit webpages hosted by the insurance providers). The roadside assistance system 10 may utilize the dynamically updated user data that has unified data format/structure and/or stored in digital ledger to provide more efficient and accurate roadside assistance for the users.

As described previously, the received user data may be stored in the one or more databases 54. In certain embodiments, the received user data may be re-organized or re-formatted into a unified data format or a data structure, or may be used to create digital ledgers. At process block 208, the roadside assistance system 10 may build a machine learning model based on the received user data including the user driving behavior and the list of services. For example, the roadside assistance system 10 may use the generated model to perform a variety of tasks associated with roadside assistance services, such as identifying a group of users that may provide roadside assistance requested by a user, determining a suitable user for performing the requested roadside assistance, and the like. The model may be generated based on data related to the skills that each user may possess with respect to providing roadside assistance, expected locations of the users at different times of days and/or weeks, historical data related to different users providing roadside assistance services in the past, and the like. The historical data may include information regarding the type of roadside assistance services that the user provided in the past, a duration of time that the users spent in providing the roadside assistance service, feedback from the user regarding a recently performed roadside service, compensation received by the user for performing the roadside service, and the like. Based on the collected data described herein, the roadside assistance system 10 may generate the model to characterize the likelihood of various users to perform certain roadside assistance tasks during different time periods and when located in certain areas. That is, the model may allow the roadside assistance system 10 to better identify or rank users that may be willing to perform a certain requested roadside assistance task at a particular time and in a particular location.

To improve accuracies and/or efficiencies of performing the variety of tasks, in certain embodiments, the roadside assistance system 10 may continue to train the model via machine learning techniques to update a previously generated model to better facilitate roadside assistance for users, who may request roadside assistance to resolve issues with their vehicles during road trips. After retraining or updating the model with the machine learning algorithms and the updated data, the roadside assistance system 10 may have improved parameters (e.g., monitoring, analysis, and/or decision-making parameter(s)) and model(s) (e.g., the machine learning model).

As discussed above, the roadside assistance system 10 may train the model with various data, such as historical roadside assistance record data, user input data, user behavior data, or a combination thereof. The training may utilize one or more suitable machine learning algorithms including, but are not limited to supervised machine learning algorithms, unsupervised machine learning algorithms, other suitable machine learning algorithms, or a combination thereof. In some embodiments, one or more machine learning processes may be performed (e.g., by a machine learning circuitry or software) to generate the machine learning model based on a sample of the clean data, known as "training data," in order to make predictions or decisions without being explicitly programmed to perform the one or more specific tasks. The machine learning model may include a variety of computational models, such as a simulation model, an optimization model, a predictive model, a forecast model, or other suitable models. The roadside assistance system 10 may use the machine learning model to perform one or more specific tasks with or without using explicit instructions (e.g., from an operator).

At process block 210, the roadside assistance system 10 may store the machine learning model in a database. As mentioned previously, the user data may be updated on time basis, on on-demand basis, or via other methods. As such, the roadside assistance system 10 may utilize the dynamically updated user data to continuously and/or cumulatively update the machine learning model to provide enhanced roadside assistance for the users with improved accuracies and/or efficiencies.

The stored machine learning model may be utilized by the roadside assistance system 10 to identify a group of users that may provide roadside assistance requested by a user (e.g., a stranded driver) and determine a suitable user for performing the requested roadside assistance. Additional details with regard to identifying the group of users and determining the suitable user for providing roadside assistance will be discussed in detail below with reference to FIG. 4.

Figure 4:
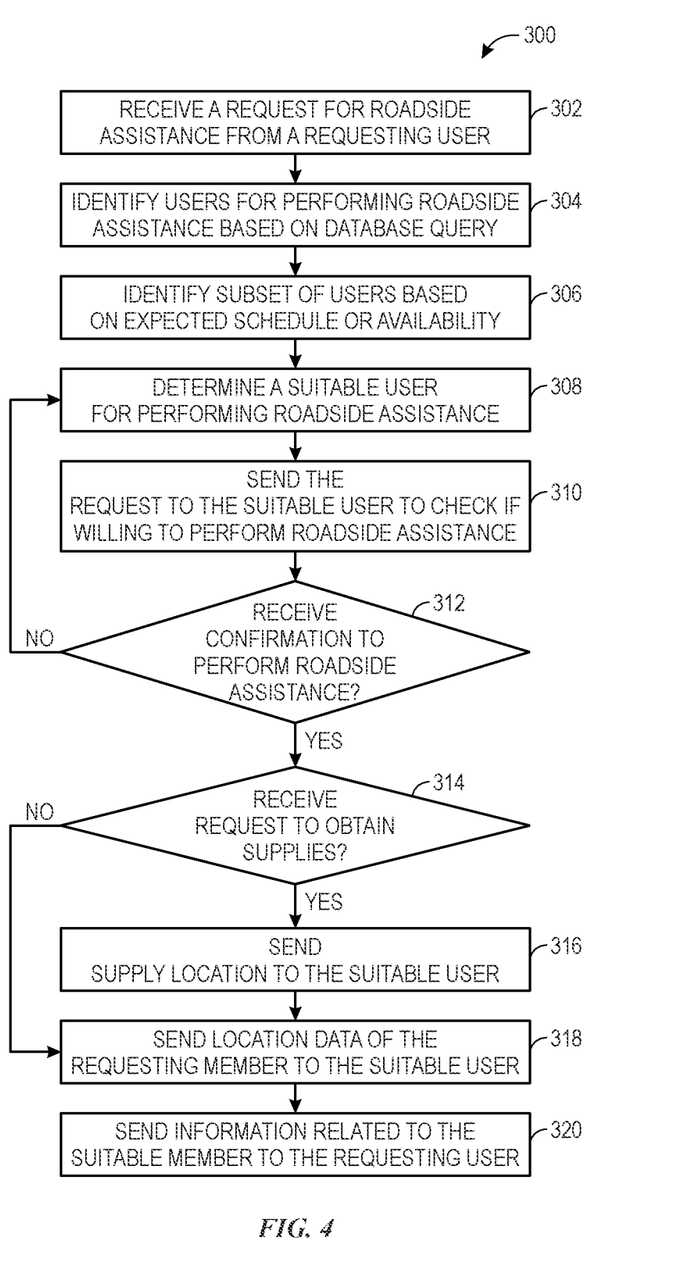
FIG. 4 illustrates a flow diagram of an example method for using crowdsourcing to provide roadside assistance, in accordance with embodiments described herein.

With the preceding in mind, FIG. 4 illustrates a flow diagram of an example method 300 for using crowdsourcing to provide roadside assistance in accordance with the embodiments described herein. Although the example method 300 described in FIG. 4 is described in a particular order, it should be noted that the example method 300 may be performed in any suitable order and is not limited to the order presented herein. It should also be noted that although each processing block is described below in the example method 300 as being performed by the roadside assistance system 10, other suitable computing system(s) may perform at least one of the process blocks described herein.

Referring now to FIG. 4, at process block 302, the roadside assistance system 10 may receive a request for roadside assistance from a requesting user. The requesting user may send the request via a mobile device (e.g., one or the mobile devices 26 or 36). The request may include a current location of the requesting user and/or a vehicle that the requesting user operates, a type of roadside assistance that the requesting user seeks, a desired time or time range that the requesting user expects the service, and the like. In some embodiments, the received request may include an identification (ID) of the requesting user. For example, the ID may be used by the roadside assistance system 10 to locate an insurance policy associated with the user to determine the identification of the requesting user. In some embodiments, the roadside assistance system 10 may use the ID to access the vehicle system on the vehicle of the requesting user to acquire/confirm the location information of the requesting user.

At process block 304, the roadside assistance system 10 may identify users that may be capable of performing roadside assistance based on a database query. For example, the roadside assistance system 10 may send a query to the one or more databases 54 to identify a set of users that have indicated that they are willing or interested to provide the requested roadside assistance. As described previously, the user data stored in the one or more databases 54 may be stored in a unified data format or a data structure to better facilitate the database query with improved efficiency, reduced querying time, and/or reduced cost. In some embodiments, the roadside assistance system 10 may user the model generated in the method 200 described above to identify the users that may be capable of providing aid.

After a set of users are identified, at process block 306, the roadside assistance system 10 may identify a subset of users based on expected schedule or availability. For example, the roadside assistance system 10 may determine, based on other information in the user data associated with each of the set of users to determine the subset of users that may be able to provide the requested roadside assistance within certain amount of time (e.g., based on the desired time or time range that the requesting user expects). Such information may include, but is not limited to a location of a user, frequency of use of a vehicle by the user, frequent times at which the vehicle is in use by the user, frequent route(s) of the vehicle with the user, frequent passenger(s) on the vehicle with the user, and the like. In one embodiment, the roadside assistance system 10 may determine (e.g., based on current locations via the vehicle systems or other mobile devices of the users) that one or more users among the set of users may be located greater than a threshold distance from the location of the requesting user. As such, those users may be excluded from the subset of users. In another embodiment, the roadside assistance system 10 may monitor the user behavior to identify users that may be able to provide certain services. For instance, users that have indicated that they carry gas containers in their vehicles may be able to provide fuel refill services.

In another embodiment, the roadside assistance system 10 may identify schedule conflicts or family obligations (e.g., if kids in the car) and determine whether the users will be able or willing to provide the requested roadside assistance within the certain amount of time. In other words, if the roadside assistance system 10 detects that a user travels from a childcare facility to his home during a certain time period, the roadside assistance system 10 may determine that the user may be unable or unlikely to provide a roadside service during the time period.

In certain embodiments, the machine learning model described in the process block 208 of FIG. 3 may be used to facilitate identifying the subset of users based on expected schedule or availability. In some cases, the roadside assistance system 10 may extract additional information from the machine learning model to improve the accuracy of the identification process described above. For example, the roadside assistance system 10 may access additional data sources to obtain the additional data, such as current and/or historical traffic data, weather data, road construction data, other suitable data, or a combination thereof. The additional data may be utilized by various simulation models, forecast models, prediction models included in the machine learning model to improve the accuracy of identifying the subset of users. For example, some of the set of users identified at process block 304 may have certain expected driving routes that include repair/construction, may experience certain weather conditions (e.g., storm, flooding), and the like. As such, those users may be excluded from the subset of users.

At process block 308, the roadside assistance system 10 may determine one or more suitable users for performing roadside assistance. In some embodiments, the roadside assistance system 10 may utilize the machine learning model to determine the one or more suitable users from the subset of users identified at the process block 306 based on a current location of each user, driving behavior (e.g., frequent driving routes) of each user, and the like. The machine learning model may be used to generate a ranking or a score for each user in the subset of users that assesses a likelihood of a respective user in providing requested services, assesses an ability of the respective user in providing the requested services, and the like. For example, a user having highest rank or score may be determined as a suitable user for the requested roadside service. In some embodiments, additional information may be used to determine the ranking or the score. For example, the roadside assistance system 10 may use feedback information to vet the users providing roadside assistance. For example, the roadside assistance system 10 may use previous ratings from other roadside assistance services performed in the past (e.g., feedback from a requesting user to confirm that certain roadside assistance services have been performed in a timely manner) to determine the suitable user.

At process block 310, the roadside assistance system 10 may send the request to the suitable user to check if the user is willing to perform the requested roadside assistance. The request may be received by the user's device and may automatically open an application on the user's device associated with the roadside assistance system 10. In this way, the request may cause the application to automatically provide a notification (e.g., audible, visual, haptic) to alert the user of the request for the roadside assistance. The notification may also include presenting a visualization or prompt that may receive a confirmation from the suitable user indicating that the user can arrive at the requested location at a desired time or time range to perform the requested service. The request may be sent to the user devices of the suitable user via a push notification, a text message, a phone call, an email, and the like.

At process block 312, the roadside assistance system 10 may determine whether a confirmation to perform the requested roadside assistance is received. If the suitable user sends the confirmation indicating the requested roadside assistance cannot be performed within the desired time or time range, the roadside assistance system 10 may return to the process block 308 to identify another suitable user for performing the requested roadside assistance. For example, the next suitable user may be among the subset of users identified at the process block 306. Such determination and requesting for confirmation processes may be continued until a suitable user confirms that the requested roadside service is to be performed within the desired time or time range or until each of the users has rejected the request to provide the roadside service.

On the other hand, if the suitable user sends the confirmation indicating that the user is accepting the request to perform the roadside assistance within the desired time or time range, the roadside assistance system 10 may send a follow up message to determine whether certain supplies (e.g., fuel, a gas can, a replacement tire, a battery jump cable, a battery jump starter, a replacement battery) is desired for the requested roadside assistance. If the user indicates that some or all of the supplies may be desired, the roadside assistance system 10 may send a signal to the user's device to cause the user's device to execute a navigation service to direct the user to a location in which the supplies may be stationed.

In some embodiments, the user may send a request to obtain supplies without being prompted by the roadside assistance system 10. That is, the application associated with the roadside assistance system 10 executed by the user's device may include an option to send a request to obtain supplies after sending the confirmation to perform the roadside assistance.

At process block 314, the roadside assistance system 10 may determine whether a request to obtain supplies is received. If the suitable user sends the request for certain supplies, at process block 316, the roadside assistance system 10 may retrieve a supply location from a database and send the supply location to the suitable user (e.g., via the mobile devices of the suitable user). In some embodiments, the roadside assistance system 10 may direct the suitable user to one or more supply locations where one or more ready-made bags are available for pickup for the requested roadside service. In some embodiments, the roadside assistance system 10 may send a machine-readable code (e.g., barcode, quick response (QR) code) to the user's device, such that the user may confirm pickup of the supplies. That is, the machine-readable code may be presented to a computing device of the supplier to confirm or record a time and date in which the user picked up the supplies. Additionally or alternatively, the roadside assistance system 10 may detect that the user purchased certain supplies while route to perform the roadside service or during the time period in which the roadside service was scheduled. The roadside assistance system 10 may then automatically reimburse or fund a bank account associated with the user for a purchase of certain supplies.

In some embodiments, the roadside assistance system 10 may use the machine learning model to determine a suitable location (e.g., with a threshold distance of the current location of the suitable user or close to an expected route used by the suitable user) based on the user data and other relevant data (e.g., road condition, weather condition). Furthermore, at process block 318, the roadside assistance system 10 may send location data of the requesting user to the computing device of the user providing the requested service.

If, at process block 314, the roadside assistance system 10 receives a confirmation from the user indicating that supplies are not needed for the requested roadside assistance, the roadside assistance system 10 may skip the process block 316 and send the location data of the requesting user to the computing device of the user providing the requested service (at process block 318).

After identifying the user for performing the roadside service, at process block 320, the roadside assistance system 10 may send information related to the suitable user to the requesting user. Such information may include confirmation message received from the suitable user, current location of the suitable user, expected route of the suitable user to the location of the requesting user (e.g., based on the machine learning model and other suitable information), profile data (e.g., picture) of the user, and the like.

The technologies described in the disclosed embodiments include a roadside assistance system that utilizes crowdsourcing to collect user input and monitors user behavior. Based on the collected user input and monitored user behavior, the roadside assistance system builds a machine learning model. Upon receiving a request for roadside assistance from a driver, the roadside assistance system utilizes the machine learning model to identify a suitable user who can provide the requested roadside assistance to the driver within a suitable time, and guide the identified suitable user to a location where the driver is stranded. Furthermore, the roadside assistance system may direct a user to a location where ready-made bags for certain products/supplies are available for pick up. The user may utilize the ready-made bags to performing the requested roadside assistance.

Additionally, the roadside assistance system may utilize crowdsourcing to provide rental vehicles to users. Such rental services may reduce rental costs for insurance providers and may provide additional income for the users. In some embodiments, the crowdsourcing may be used to provide access to certain tools/supplies, such as dehumidifier and/or electrical fans that may be used for drying carpet (e.g., due to water leakage or broken pipelines), preventing/eliminating moldings, and the like.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a communication component; and
   a processor configured to couple to the communication component, wherein the processor is configured to:
      receive a list of services associated with each of a plurality of users, wherein each list of services comprises one or more services that a respective user of the plurality of users is willing to provide;
      receive driving behavior data of each of the plurality of users;
      build a model representative of an expected location of each of the plurality of users based on the driving behavior data of each of the plurality of users;
      receive a request for roadside assistance from a first computing device associated with a first user;
      identify a portion of the plurality of users to perform the roadside assistance based on the model;
      send a request to perform the roadside assistance to one or more computing devices associated with the portion of the plurality of users, wherein the request is configured to cause one or more applications to open and present one or more visualizations indicative of the request via the one or more computing devices, wherein each of the one or more visualizations comprises a prompt configured to receive an input corresponding to a confirmation that a respective user of the portion of the plurality of users is accepting the request;
      receive an acceptance to the request from a second computing device of the one or more computing devices, in response to the second computing device receiving a respective input via a respective prompt of a respective visualization presented via an electronic display of the second computing device, the respective input being received by a second user of the portion of the plurality of users, and wherein the second computing device is configured to send the acceptance in response to receiving the respective input;
      send a second request associated with one or more supplies for performing the roadside assistance to the second computing device, wherein the second request is configured to cause a respective application of the second computing device to present an additional visualization comprising an additional prompt configured to receive an additional input for indicating that the one or more supplies are not present with the second user;
      receive an indication from the second computing device in response to the second computing device receiving the additional input from the second user via the additional visualization presented on the electronic display;
      in response to receiving the indication, send a signal to the second computing device to cause the second computing device to execute a navigation service configured to:
         receive a first location of the first computing device from a first location sensor positioned within the first computing device in response to receiving the acceptance;
         determine a supply location associated with the one or more supplies in response to receiving the indication by querying a database comprising a plurality of supply locations;
         detect a current location of the second computing device by receiving a second location from a second location sensor positioned within the second computing device;
         generate one or more instructions for directing the second user to the supply location based on the current location, wherein the supply location is on route to the first location;
         presenting the one or more instructions via the electronic display of the second computing device; and
      send information associated with the second user to the first computing device, wherein the information comprises the current location of the second computing device relative to the first location of the first computing device and an expected route of the second user relative to the first user, and wherein the first computing device is configured to present the information via an additional electronic display.

2. The system of claim 1, wherein the processor is configured to send a machine-readable code to a second computing device, and wherein the machine-readable code is configured to be scanned by a third computing device to record a time and date in which the one or more supplies are received.

3. The system of claim 1, wherein the list of services comprises ride-share, air pumping, flat tire replacement, battery jumping, battery replacement, fuel refill, medical skills, or any combination thereof.

4. The system of claim 1, comprising a plurality of vehicle systems on a plurality of vehicles of the plurality of users, wherein each of the plurality of vehicle systems is configured to monitor a respective location of each of the plurality of vehicle, a respective frequency of use of each of the plurality of vehicles, one or more respective time periods at which each of the plurality of vehicles is in use, one or more respective routes of each of the plurality of vehicles, or any combination thereof.

5. The system of claim 4, wherein the plurality of vehicle systems is communicatively coupled to a plurality of sensors configured to acquire data associated with the plurality of users, the plurality of vehicles, or both, wherein the plurality of sensors comprises an infrared sensor, a pressure sensor, a weight sensor, an image sensor, a light detecting and ranging sensor, a location sensor, an odometer, a speedometer, a brake sensor, or any combination thereof.

6. The system of claim 1, wherein the list of services and the driving behavior data are re-organized or re-formatted into a unified data format or a data structure.

7. The system of claim 6, wherein the list of services and the driving behavior data are stored in one or more digital ledgers.

8. The system of claim 7, wherein each of the one or more digital ledgers comprises a header comprising one or more identification parameters associated with a respective user of the plurality of users and a payload comprising one or more data entries structured according to a particular order, such that different types of the list of services and the driving behavior data are stored in different positions or offsets with respect to the header.

9. A method, comprising:
receiving, via at least one processor, a list of services associated with each of a plurality of users, wherein each list of services comprises one or more services that a respective user of the plurality of users is willing to provide;
receiving, via the at least one processor, driving behavior data of each of the plurality of users;
building, via the at least one processor, a model representative of an expected location of each of the plurality of users based on the driving behavior data of each of the plurality of users;
receiving a request for roadside assistance from a first computing device associated with a first user;
identifying, via the at least one processor, a portion of the plurality of users to perform the roadside assistance based on the model;
sending, via the at least one processor, a request to perform the roadside assistance to one or more computing devices associated with the portion of the plurality of users, wherein the request is configured to cause one or more applications to open and present one or more visualizations indicative of the request via the one or more computing devices, wherein each of the one or more visualizations comprises a prompt configured to receive an input corresponding to a confirmation that a respective user of the portion of the plurality of users is accepting the request;
receiving, via the at least one processor, an acceptance to the request from a second computing device of the one or more computing devices, in response to the second computing device receiving a respective input via respective prompt of a respective visualization presented via an electronic display of the second computing device, the respective input being received by a second user of the portion of the plurality of users, and wherein the second computing device is configured to send the acceptance in response to receiving the respective input;
sending, via the at least one processor, a second request associated with one or more supplies for performing the roadside assistance to the second computing device, wherein the second request is configured to cause a respective application of the second computing device to present an additional visualization comprising an additional prompt configured to receive an additional input for indicating that the one or more supplies are not present with the second user;
receiving, via the at least one processor, an indication from the second computing device in response to the second computing device receiving the additional input from the second user via the additional visualization presented on the electronic display;
in response to receiving the indication, sending, via the at least one processor, a signal to the second computing device to cause the second computing device to execute a navigation service configured to:
receiving, via the at least one processor, a first location of the first computing device from a first location sensor positioned within the first computing device in response to receiving the acceptance;
determining, via the at least one processor, a supply location associated with the one or more supplies in response to receiving the indication by querying a database comprising a plurality of supply locations;
detecting, via the at least one processor, a current location of the second computing device by receiving a second location from a second location sensor positioned within the second computing device;
generating, via the at least one processor, one or more instructions for directing the second user to the supply location based on the current location, wherein the supply location is on route to the first location;
presenting, via the at least one processor, the one or more instructions via the electronic display of the second computing device; and
sending, via the at least one processor, information associated with the second user to the first computing device, wherein the information comprises the current location of the second computing device relative to the first location of the first computing device and an expected route of the second user relative to the first user, and wherein the first computing device is configured to present the information via an additional electronic display.

10. The method of claim 9, wherein the request is received via a microsite, a crowd source device, or both.

11. The method of claim 10, wherein the microsite is hosted by a server.

12. The method of claim 10, wherein the crowd source device comprises crowdsourcing software linked to the microsite or one or more crowdsourcing web pages.

13. The method of claim 9, wherein the list of services comprises ride-share, air pumping, flat tire replacement, battery jumping, battery replacement, fuel refill, medical skills, or any combination thereof.

14. The method of claim 9, comprising accessing additional data sources to obtain additional data comprising current or historical traffic data, weather data, road construction data, or any combination thereof.

15. The method of claim 14, wherein building the model comprises applying the driving behavior data and the additional data to one or more simulation models, one or more forecast models, or one or more prediction models associated with predicting the expected location of each of the plurality of users.

16. The method of claim 9, wherein the information comprises the acceptance to the request, a second location of the second computing device, an expected route from the second location to the location, profile data of the second user, or any combination thereof.

17. A non-transitory computer-readable medium comprising computer-executable instructions that, when executed, are configured to cause one or more processors to perform operations comprising:
receiving a list of services associated with each of a plurality of users, wherein each list of services comprises one or more services that a respective user of the plurality of users is willing to provide;
receiving driving behavior data of each of the plurality of users;
building a model representative of an expected location of each of the plurality of users based on the driving behavior data of each of the plurality of users;
receiving a request for roadside assistance from a first computing device associated with a first user;
identifying a portion of the plurality of users to perform the roadside assistance based on the model;

sending a request to perform the roadside assistance to one or more computing devices associated with the portion of the plurality of users, wherein the request is configured to cause one or more applications to open and present one or more visualizations indicative of the request via the one or more computing devices, wherein each of the one or more visualizations comprises a prompt configured to receive an input corresponding to a confirmation that a respective user of the portion of the plurality of users is accepting the request;

receiving an acceptance to the request from a second computing device of the one or more computing devices, in response to the second computing device receiving a respective input via a respective prompt of a respective visualization presented via an electronic display of the second computing device, the respective input being received by a second user of the portion of the plurality of users, wherein the visualization comprises an input for accepting the request, and wherein the second computing device is configured to send the acceptance in response to receiving the respective input;

sending a second request associated with one or more supplies for performing the roadside assistance to the second computing device, wherein the second request is configured to cause a respective application of the second computing device to present an additional visualization comprising an additional prompt configured to receive an additional input for indicating that the one or more supplies are not present with the second user;

receiving an indication from the second computing device in response to the second computing device receiving the additional input from the second user via the additional visualization presented on the electronic display;

in response to receiving the indication, sending a signal to the second computing device to cause the second computing device to execute a navigation service configured to:

receiving a first location of the first computing device from a first location sensor positioned within the first computing device in response to receiving the acceptance;

determining a supply location associated with the one or more supplies in response to receiving the indication by querying a database comprising a plurality of supply locations;

detecting a current location of the second computing device by receiving a second location from a second location sensor positioned within the second computing device;

generating one or more instructions for directing the second user to the supply location based on the current location, wherein the supply location is on route to the first location;

presenting the one or more instructions via the electronic display of the second computing device, wherein the supply location is on route to the location; and sending information associated with the second user to the first computing device, wherein the information comprises the current location of the second computing device relative to the first location of the first computing device and an expected route of the second user relative to the first user, wherein the first computing device is configured to present the information via an additional electronic display.

18. The non-transitory computer-readable medium of claim 17, wherein the list of services and the driving behavior data are re-organized or re-formatted into a unified data format or a data structure.

19. The non-transitory computer-readable medium of claim 17, wherein the list of services and the driving behavior data are stored in one or more digital ledgers.

* * * * *